United States Patent [19]

Kanao

[11] 4,230,899
[45] Oct. 28, 1980

[54] ELECTROCONDUCTIVE HOSE FOR CLEANER

[76] Inventor: Shiro Kanao, 32-460, Nanpeidai, Takatsuki-shi, Osaka-fu, Japan

[21] Appl. No.: 935,375

[22] Filed: Aug. 21, 1978

[51] Int. Cl.³ .................. A47L 9/24; F16L 11/12; H01B 5/10; H01B 7/00
[52] U.S. Cl. .................. 174/47; 174/119 R; 174/130
[58] Field of Search .............. 174/47, 119 R, 126 CP, 174/128 R, 130

[56] References Cited
U.S. PATENT DOCUMENTS 2,998,474  8/1961  Pavlic ..................... 174/47

FOREIGN PATENT DOCUMENTS 42-2621  2/1967  Japan ........................ 174/47
47-8877  3/1972  Japan ........................ 174/47
862660  3/1961  United Kingdom ......... 174/47

Primary Examiner—Laramie E. Askin
Attorney, Agent, or Firm—Kane, Dalsimer, Kane, Sullivan and Kurucz

[57] ABSTRACT

A hose for cleaners comprising a bellows-shaped hose main body and two reinforcing synthetic resin elements arranged side by side axially of the hose and helically wound on and attached to the inner surface of the hose main body. Each of the reinforcing helical elements has embedded therein a conductor comprising a hard steel wire and a plurality of thin copper wires provided on the outer periphery of the hard steel wire and extending longitudinally thereof.

6 Claims, 5 Drawing Figures

ELECTROCONDUCTIVE HOSE FOR CLEANER

BACKGROUND OF THE INVENTION

This invention relates to a hose for use in cleaners of the power nozzle type, and more particularly to improvements in a cleaner hose which is electrically conductive and which has embedded therein helical conductors for electrically connecting a switch for a drive device on the forward end of the hose to a main switch mounted on a hose gripping portion and positioned closer to the main body of a cleaner.

Conductive cleaner hoses of this type heretofore known include those in which copper wires helically wound on and attached to the inner surface of a bellows-shaped hose wall for reinforcing the hose serve also as conductors. With such hoses, reinforcing copper wire conductors of large diameter having a sufficient load capacity to pass great current, if used, will seriously impair properties such as stretchability and flexibility which are essentially required of the hoses. Conversely, the use of copper wires of small diameter as conductors and reinforcing elements so as to ensure improved stretchability and higher flexibility entails a voltage drop, rendering the copper wires unable to pass great current, and further involves the drawback that the copper wires fail to give sufficient strength for the hose to retain its shape. Consequently, when the hose is repeatedly subjected to external forces as by being trampled, stretched or bent during use, the copper wires soon will break and become unable to provide reinforcement for the hose and to serve as a conductor.

Another cleaner hose is known which comprises a bellows-shaped hose main body and two reinforcing elements of thermoplastic elastic material arranged side by side and helically wound around and attached to the outer surface of the hose main body, each of the reinforcing helical elements having embedded therein a conductor composed of a hard steel wire and twisted copper wires wound around the hard steel wire. The conductor embedded in the helical element has a relatively large diameter and therefore has the advantage of being capable of passing greater current than those of the conventional hoses described. However, the conductor-incorporating reinforcing helical elements which are arranged on the outer surface of the hose are liable to wear away early from outside to expose the conductors since the hose is invariably dragged during the use of the cleaner. As a result, troubles such as a short circuit or electric shock are very likely to develop. Moreover, the reinforcing elements of increased cross sectional area required have the drawback of rendering the hose less stretchable and flexible.

SUMMARY OF THE INVENTION

The main object of this invention is to eliminate the drawbacks inherent in the conventional conductive cleaner hoses described above.

To fulfil the above object, the present invention provides a conductive hose for cleaners comprising a bellows-shaped hose main body and two reinforcing synthetic resin elements arranged side by side axially of the hose and helically wound on and attached to the inner surface of the hose main body, the cleaner hose being characterized in that each of the reinforcing helical elements has embedded therein a conductor comprising a hard steel wire and a plurality of thin copper wires provided on the outer periphery of the hard steel wire and extending longitudinally thereof.

The conductor embedded in each of the two reinforcing helical elements is composed of a hard steel wire and a plurality of copper wires provided on the outer periphery of the hard steel wire and extending longitudinally thereof. With this construction, a conductor having a large diameter relative to the cross section of the reinforcing helical element and therefore possessing a high conductivity can be embedded in the element for the passage of great current, whereas the reinforcing helical elements so constructed impart sufficient shape-retaining strength to the hose without giving substantially detrimental effects on the stretchability and flexibility of the hose itself. Because the conductors are embedded in the reinforcing elements, they can be fully protected from external forces which will frequently act thereon when the hose is stretched or bent during use. Thus the hose retains a satisfactory conductivity over a prolonged period of time. Additionally, the conductor-incorporating reinforcing helical elements, which are helically wound along and attached to the inner surface of the hose main body, render the hose serviceable over a greatly lengthened period of time before the hose is worn away to expose the conductors by being dragged during the use of the cleaner. Accordingly, the cleaner hose in its entirety retains a stable conductivity during its prolonged life free of troubles such as a short circuit or electric shock.

DESCRIPTION OF THE PREFERRED EMBODIMENTS

Figure 1:
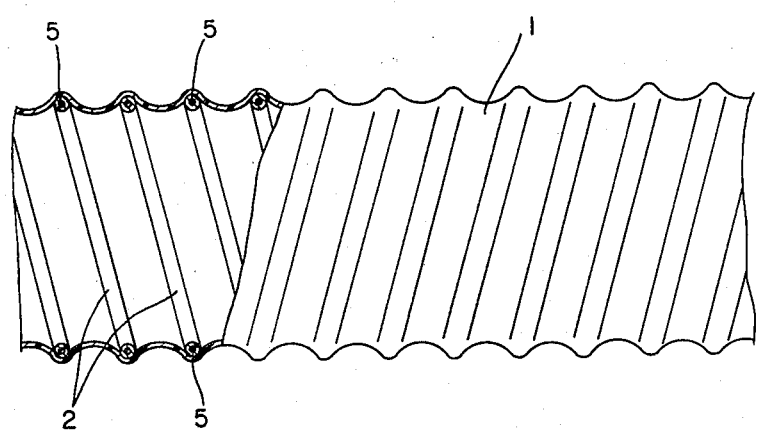
FIG. 1 is a side elevation partly broken away and showing a conductive cleaner hose embodying this invention.
Figure 2:
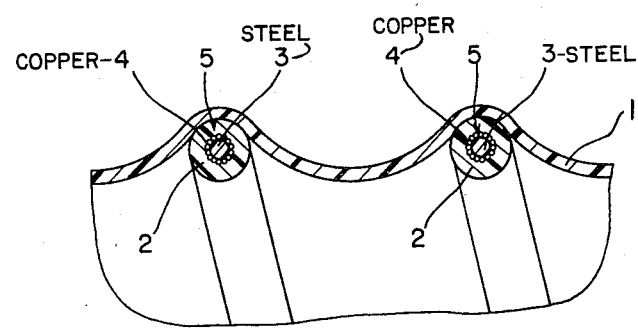
FIG. 2 is a fragmentary enlarged side elevation in vertical section showing the same.

Embodiments of this invention will be described below in detail. FIG. 1 shows a cleaner hose comprising a bellows-shaped hose main body 1 made of soft synthetic resin and two reinforcing elements 2 of hard synthetic resin arranged side by side axially of the hose and helically wound on and attached to the inner surface of the hose main body. As shown in FIG. 2, each of the reinforcing helical elements 2 has embedded therein a conductor 5 comprising a hard steel wire 3 and a plurality of thin copper wires 4 provided on the outer periphery of the hard steel wire 3 and extending longitudinally thereof. The two conductors 5 serve as a positive conductor and a negative conductor for electrically connecting a switch for a drive device on the forward end of the hose to a main switch mounted on a hose gripping portion and positioned closer to the main body of a cleaner. Piano wires are useful as the hard steel wires 3.

Figure 3:
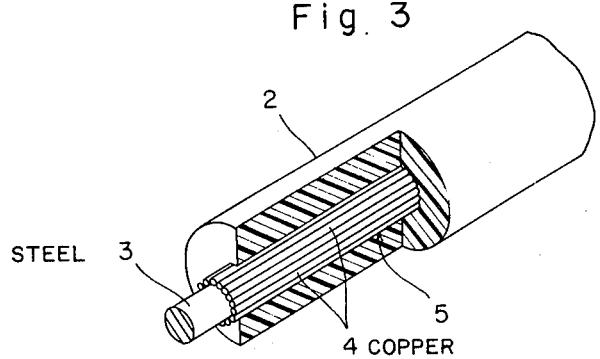
FIGS. 3 to 5 are enlarged perspective views partly broken away and each showing a reinforcing helical element.
Figure 4:
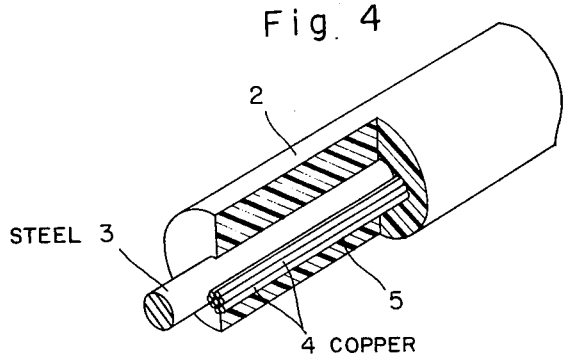
Figure 5:
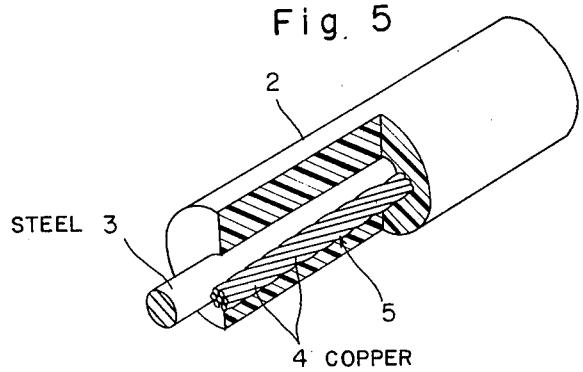

The hard steel wire 3 and the plurality of thin copper wires 4 may be arranged as shown in FIGS. 3, 4 or 5 to form the conductor 5. With reference to FIG. 3, the plurality of thin copper wires 4 are arranged in parallel or substantially in parallel to one another over the entire outer periphery of the hard steel wire 3. FIG. 4 shows the plurality of thin copper wires 4 in the form of a bundle extending along part of the outer periphery of the hard steel wire 3. The plurality of thin copper wires 4 shown in FIG. 5 are twisted together in the form of a bundle and provided along part of the outer periphery of the hard steel wire 3. In any of these arrangements, the copper wires 4 must be disposed along the hard steel wire 3 longitudinally thereof. The copper wires 4 are also shown to be substantially parallel to the hard steel wires 3 and are not wound about them.

I claim:

1. An electroconductive hose for cleaners comprising a bellows-shaped hose main body and two reinforcing synthetic resin elements arranged side by side axially of the hose and helically wound on and attached to the inner surface of the hose main body, each of the reinforcing helical elements having embedded therein an electrical conductor comprising a hard steel wire and a plurality of thin copper wires provided on the outer periphery of the hard steel wire and extending longitudinally thereof, said thin copper wires arranged substantially parallel to said hard steel wire.

2. A hose as defined in claim 1 wherein the plurality of thin copper wires are arranged in parallel or substantially in parallel to one another over the entire outer periphery of the hard steel wire.

3. A hose as defined in claim 1 wherein the plurality of thin copper wires are in the form of a bundle extending along part of the outer periphery of the hard steel wire.

4. A hose as defined in claim 3 wherein the hard steel wire is a piano wire.

5. A hose as defined in claim 1 wherein the plurality of thin copper wires are twisted together in the form of a bundle extending along part of the outer periphery of the hard steel wire.

6. A hose as defined in claim 1 wherein said thin copper wires are substantially parallel to each other.

* * * * *